Dec. 31, 1929.  R. B. McMULLEN, JR  1,741,858
AUTOMATIC TRANSMISSION
Filed July 9, 1928  3 Sheets-Sheet 1

INVENTOR
ROGER B. McMULLEN JR.
BY
ATTORNEY

Dec. 31, 1929.  R. B. McMULLEN, JR  1,741,858
AUTOMATIC TRANSMISSION
Filed July 9, 1928   3 Sheets-Sheet 2

INVENTOR
ROGER B. McMULLEN JR.
BY
*William H. Knight*
ATTORNEY

Dec. 31, 1929.          R. B. McMULLEN, JR          1,741,858
                        AUTOMATIC TRANSMISSION
                         Filed July 9, 1928          3 Sheets-Sheet 3
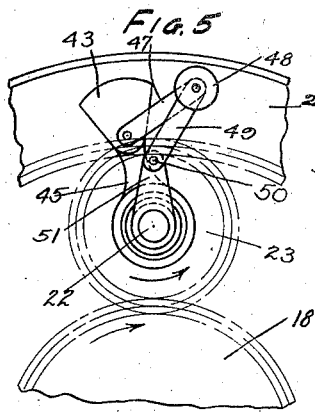
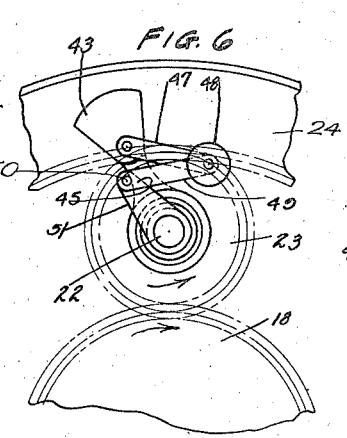
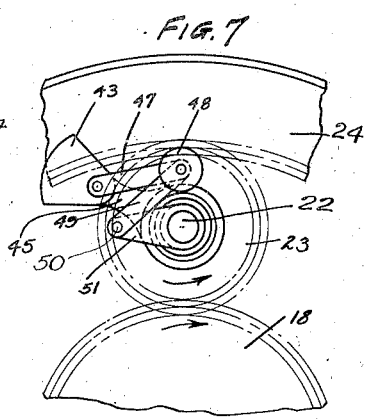
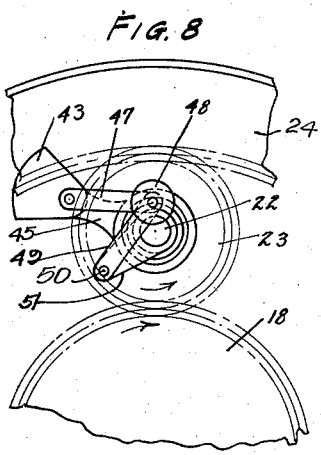
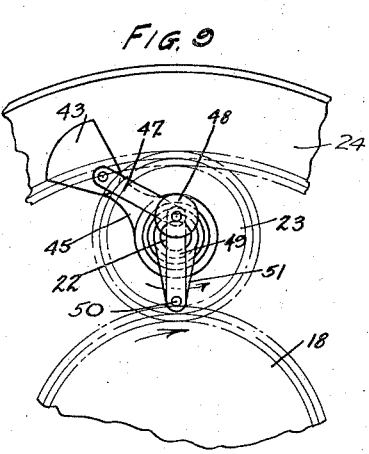
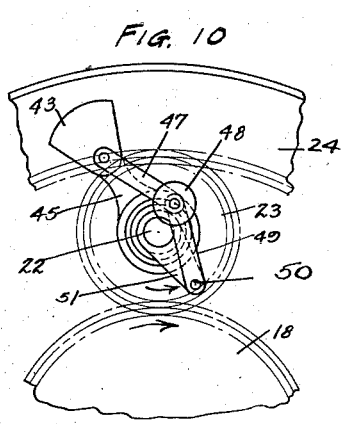
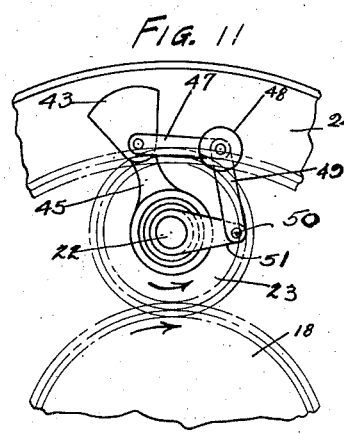
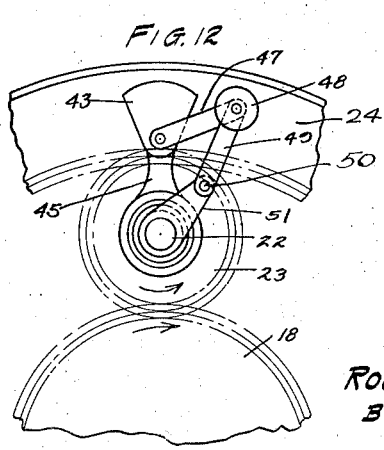
INVENTOR
ROGER B. McMULLEN JR.
BY
ATTORNEY Patented Dec. 31, 1929

1,741,858

UNITED STATES PATENT OFFICE

ROGER B. McMULLEN, JR., OF EVANSTON, ILLINOIS, ASSIGNOR TO AUTOMATIC TRANSMISSION COMPANY, OF ROCKFORD, ILLINOIS, A CORPORATION OF ILLINOIS

AUTOMATIC TRANSMISSION

Application filed July 9, 1928. Serial No. 291,252.

The present invention relates in general to power transmitting mechanisms and has particular reference to an improved transmission which is especially adaptable for use with motor driven vehicles.

The principal object of the invention resides in the provision of a mechanism of the character described which is capable of establishing a gradual speed ratio variation from zero to maximum controlled automatically by the variations in speed and torque between a driving element and an element to be driven.

While the foregoing explains briefly the nature of the invention other objects and advantages not herein specifically referred to will be readily appreciated upon a full comprehension of the novel features presented in the construction, arrangement, and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and I therefore do not wish to be restricted to the precise construction contained herein.

Figures 5 to 12 inclusive are detail views illustrating the various relative postions of the primary and supplemental weights during a complete cycle of their operation.

Figure 1:
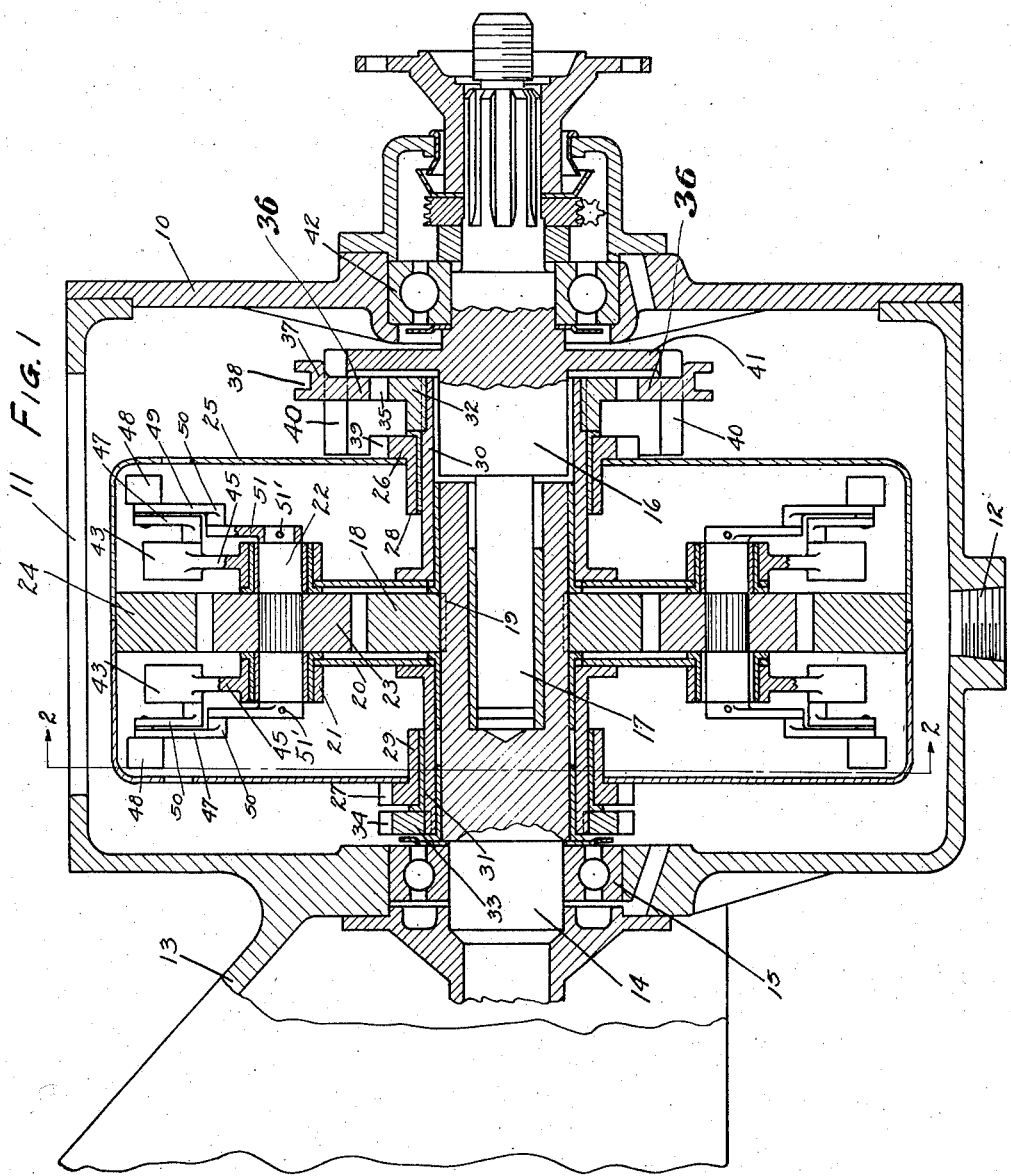
Figure 1 is a longitudinal section through the transmission.
Figure 2:
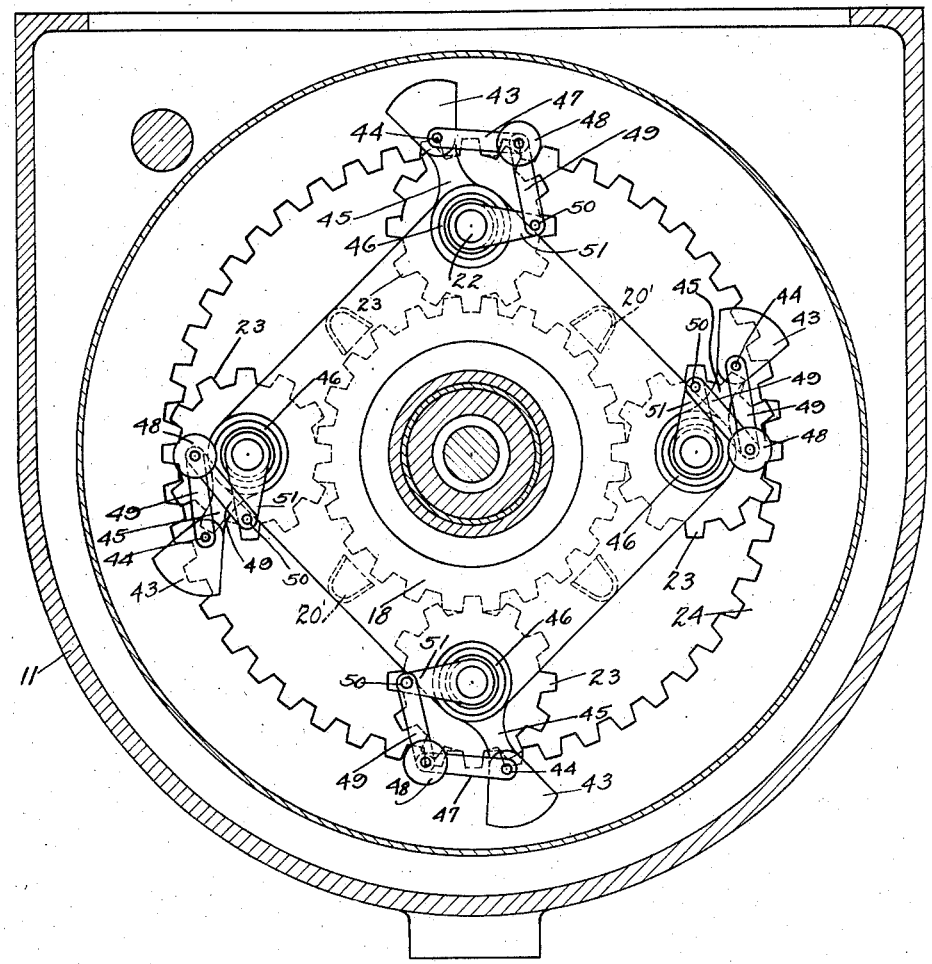
Figure 2 is a view in cross section on the line 2—2 Figure 1, looking in the direction of the arrows.
Figure 3:
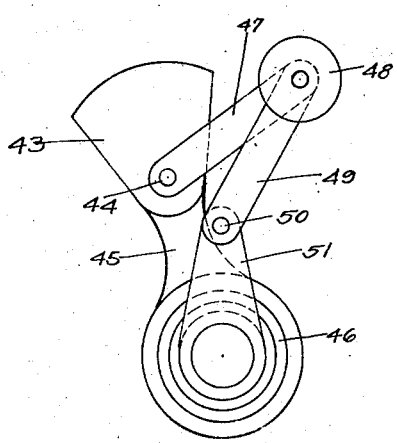
Figure 3 is a detail view illustrating the cooperative relationship of the primary and supplemental weights and link motion between the same for developing a retarding effect in the movement of the planetary system.

Referring now to the drawings in detail, and particularly to Figures 1 and 2, 10 represents a housing in which the transmission is enclosed, the same being provided with the customary hand opening 11 in the top thereof, and a drain 12 in the bottom thereof.

The housing is equipped with the forward extension 13 through which the driving shaft 14 extends into the housing. The shaft is journaled in the bearing 15 and extends rearwardly in confronting relation with the coaxially mounted driven shaft 16. The driven shaft terminates in a reduced end 17 which is mounted with freedom of rotation in an axial bore in the driving shaft.

So far as concerns the present illustrations, the drive is taken into the planetary system of the transmission from the driving shaft 14 through the sun gear 18 which is splined on the driving shaft as at 19.

The sun gear is positioned between a two-part spider 20 which is equipped with journal bearings 21 for a series of planet shafts 22 which mount a series of planet gears 23 in mesh with the sun gear 18 and also in mesh with a ring gear 24. Spacers $20^1$ are positioned between the two parts of the spider 20 and spot welded or otherwise secured thereto. These spacers are best shown in Figure 2.

The ring gear 24 is fastened to a cage 25 which in turn is secured to a clutch ring 26 on one side of the gear train and a ratchet ring 27 on the opposite side of the gear train. The rings 26 and 27 are formed on the ends of sleeves 28 and 29 respectively, which sleeves are journaled on the sleeves 30 and 31. The sleeves 30 and 31 are secured to the two parts of the spider 20 and extend in opposite directions, the extended ends of each terminating with a clutch ring 32 and a ratchet ring 33 respectively. Both of the rings 32 and 33 are splined to their sleeves.

The ring 33 is made with ratchet teeth 34 to cooperate with a pawl or other dogging device which serves as a back stop mechanism for arresting the rotation of the spider 20 in one direction at reverse speeds through the mechanism. The ring 32 is likewise made with ratchet teeth 35 which are engaged by lugs 36 on the inner periphery of a sliding collar 37. The outer circumference of the collar 37 is made with an annular groove 38 for the reception of a forked operating lever by means of which the collar 37 may be manually manipulated to move into two selective positions of operation and a neutral non-operating position.

In other words, the collar 37 serves to control the forward and reverse drive through the mechanism. When moved into the position shown in Figure 1, a forward drive is transmitted through the transmission from the spider to the clutch ring 32 then through the power take-off to the driven shaft. The back stop ring 27 is engaged by a pawl for locking the ring gear 24 and cage 25 against retrograde movement. By means to be later described a one to one drive is automatically established through the transmission in which the ring gear and cage are gradually picked up and caused to rotate with the sun gear, spider, and planet gears as a unit.

The lugs on the collar 37, as best shown in Figure 1, are mounted to slide in slots 40 provided in the forwardly extending cupshaped flange 41 on the driven shaft 16. By means of this flange the driving shaft is connected in driving relation to either the ring 32 or the ring 26 by manipulation of the collar 37, depending upon whether a reverse or forward drive is desired.

The driven shaft is journaled in the bearing 42 and extends through the housing 10 as is common in transmissions of this general type.

For reversing the drive through the mechanism, the collar 37 is moved into engagement with the clutch ring 26, the back stop mechanism engaging the ring 27 is moved to release the cage 25 and engage the ring 33 to arrest the spider. It will thus be seen that the drive will be imparted from the sun gear to the ring 24 and thence to the driven shaft through the cage and its connection with the clutch ring 26.

When the collar 37 is moved into a neutral position between the clutch rings 32 and 30, both a forward and reverse drive through the mechanism will be interrupted.

One of the distinctive features of the present invention resides in the provision of means for establishing a gradual speed ratio variation from zero to maximum and controlled automatically by variations in driving speed to variations in the balance of the torque between the driving and the driven shafts. In this way the transmission will be unusually effective in connection with motor vehicles wherein it is desirable to substitute automatic means for the customary hand operated speed changing mechanism.

To automatically control the speed ratio through the mechanism so as to establish a unitary drive between the driving and driven shafts when the load on the driven shaft is substantially balanced with the torque in the driving shafts centrifugal weights have been provided. These weights are employed in association with the planet shafts 22. The use of these weights serve to develop a retarding effect in the planetary movement of the planetating system, and with the retarding effect gradually increasing as the speed of the driving shaft increases so that at predetermined speeds of the drive shaft, when permitted by the decrease of the load on the driven shaft, the weights will completely arrest the planetary movement in the system and develop a one to one or unitary drive as above explained.

One of the outstanding difficulties with the use of centrifugal weights in developing the required retarding force in the planetary system is concerned primarily with the acceleration of the planetary movement at certain stages in the cycle of the operation of the weights. In other words, while the weights do impart a retarding effect to the planetary system at certain stages in their operation, they are known to have a tendency to accelerate the planetary movement at other stages, therefore the operation of the same does not develop a constant retarding effect, the force being introduced into the system at frequencies which develop pulsations and otherwise objectionable results in the operation of the transmission.

Another distinctive feature of the present invention resides in using a supplemental weight and a link motion in combination with a primary weight so as to avoid developing an accelerating effect to the planetary movement when the retarding effect should be taking place. In this way a constant retarding effect can be produced which will be gradually increased as the speed of the driving shaft increases.

The primary centrifugal weights referred to are represented at 43, the same being eccentrically mounted by a pivoted connection 44, on the end of lever 45 which in turn is equipped with freedom of rotation on each of the planet shafts 22. As shown in Figure 1 a pair of these weights are employed on opposite sides of each of the planet gears 23. It will also be observed that each of the planet shafts 22 is equipped with this weight arrangement.

Since each of the weights 43 and their cooperating mechanisms is identical in construction, it will be necessary to only explain in detail one of these, expecting, of course, that the same explanation will apply to the others.

As explained, each of the weights 43 are mounted to revolve about the planet shafts 22, independent of the shafts so far as concerns a direct connection between the weights and the shafts. Extending from the pivotal connection 44 is a link 47 which is pivoted at the center of the supplemental weight 48. Extending from this same pivot point on the weight is another link, 49, the end of which being pivoted as at 50 to end of the link 51 which is keyed or pinned as at 51' to the planet shaft 22 and thus connected to rotate therewith. With this link motion arranged as described in combination with the primary and supplementary weights 43 and 48 respectively, rotation of the planet shafts 22 will rotate the arms 51 setting up movement in the link mechanism so as to move the supplemental weights 48 and oscillate the primary weights 43.

In Figures 5 to 12 inclusive, a complete cycle of operation of this link mechanism is illustrated in different stages. Considering Figure 5 to be the first stage in the operation of the mechanism it will be noticed that the supplemental weight 48 is at its maximum outwardly position and the primary weight 43 is at the limit of its oscillating movement in one direction. The sun gear 18 and planet gears 23 are rotating in the direction indicated by the arrows.

Since the arm 51 is keyed to the planet shaft 22 rotation of the planet gear 23 as indicated by the arrow will carry the arm 51 in the same direction. As the arm 51 thus rotates in a counterclockwise direction viewed from Figure 5, it will impart a pull to the link 49, swinging the weight 48 in a direction opposite to the direction of rotation of the planet gear. As the weight 48 moves in this opposite direction, the primary weight 43 starts to move in a counterclockwise direction viewed from Figure 5, or in a direction opposite to the direction of the path of movement of the supplemental weight. This movement of the weight 43 is in response to a thrust imparted to it through the link 50.

The remaining figures in this group of 5 to 12 simply show the general path of movement of the two weights and the manner of operation of the link mechanism. By referring to Figure 4, however, it will be seen that while the primary weight 43 oscillates in about a 160 degree arc, the supplemental weight 48 has an irregular path of movement. It will thus be seen that the movement of this link mechanism will result in a constant retarding effect being delivered to the planetary movement of the system, and while there is a limited accelerating force developed by the weights, this accelerating force occurs at a timed interval in the operation of the link mechanism when the relative position of the links are such as to cooperate with the position of the weights making the accelerating force occur almost instantaneously.

At least the movement occurs so rapidly that it is all practically absorbed or eliminated by the link motion in combination with the weights and thus not transmitted to the planetary system, consequently only the retarding forces developed in the operation of the weights are transmitted to the planetary system.

The weight and link mechanism is arranged preferably in diametrically opposed pairs and the timed relation of one set to the other is such as to encourage an even retarding effect with pulsations or frequencies eliminated as near as possible from the timed operating relation of the individual sets.

Figure 4:
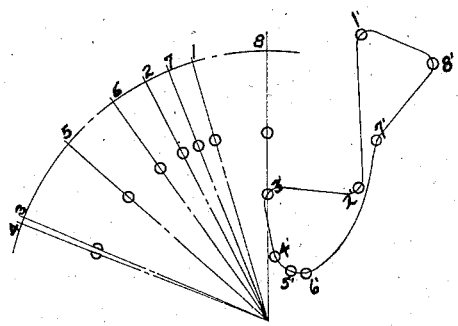
Figure 4 is a diagrammatic view illustrating the path of movements of the primary and supplemental weights.

The 12 positions of the weights 43 shown in Figures 5 to 12 inclusive are diagrammatically shown and represented in Figure 4 by the numbers 1 to 8; the various positions of the supplemental weights 48 corresponding to Figures 5 to 12 inclusive are represented by the numbers 1' to 8'.

Having thus described and shown an embodiment of my invention, what I claim and desire to secure by Letters Patent of the United States is:

1. In a transmission, driving and driven shafts, a planetary gear train connecting said shafts, a planetary shaft in said gear train and means for automatically changing the driving ratio of said gear train comprising a centrifugal weight mounted for oscillation about the axis of said planetary shaft and a link motion connecting said weight with said shaft.

2. In a transmission, driving and driven shafts, a planetary gear train connecting said shafts, a planetary shaft in said gear train and means for automatically changing the driving ratio of said gear train comprising a centrifugal weight mounted for oscillation about the axis of said planetary shaft, link motion connecting said weight with said shaft, and a supplemental weight co-acting with said link motion.

3. In a transmission, and in combination, driving and driven shafts, planetary drive mechanism connecting said shafts comprising a sun gear, a spider, planetary gears meshing with said sun gear, planetary shafts carried by said spider for mounting said planetary gears, a ring gear with which said planetary gears mesh, a cage fastened to said ring gear, means for connecting said cage in driving relation with said driven shaft and means for changing the driving ratio of said drive mechanism comprising, co-acting weights associated with each of said planetary shafts, and link motions connecting said weights with said shafts.

4. In a transmission, driving and driven elements, planetary speed changing mechanism connecting said elements, comprising a sun gear, a ring gear, motion transmitting planet gears meshing with said sun gear and said ring gear, centrifugal weights for automatically controlling the effective operation of said planet gears and link motions connecting said weights with said planet gears.

5. In a transmission, driving and driven elements, planetary speed changing mechanism connecting said elements, comprising a sun gear, ring gear, motion transmitting planet gears meshing with said sun gear and said ring gear, centrifugal weights for automatically controlling the effective operation of said planet gears, link motions connecting said weights with said planet gears and supplemental weights connected with said link motions to coact therewith.

6. In a transmission, driving and driven elements, speed changing mechanism for connecting said elements in variable driving ratios, a planetary member in said mechanism through which the drive is imparted from the driving element to the driven element and means for automatically influencing the rotation of said member about its own axis for changing the driving ratio, comprising a centrifugal responsive weight, a mounting on which said weight is journaled with freedom of oscillation and a link motion connecting said weight with said planetary member.

7. In a transmission, driving and driven elements, speed changing mechanism for connecting said elements in variable driving ratios, a planetary member in said mechanism through which the drive is imparted from the driving element to the driven element and means for automatically influencing the rotation of said member about its own axis for changing the driving ratio, comprising a centrifugal responsive weight, a mounting on which said weight is journaled with freedom of oscillation, a link motion connecting said weight with said planetary member and a supplemental weight connected with said link motion to coact therewith.

8. In a transmission, driving and driven elements, speed changing mechanism for connecting said elements in variable driving ratios, a planetary member in said mechanism through which the drive is imparted from the driving element to the driven element, a planet shaft on which said planetary member is mounted and means for automatically influencing the rotation of said planetary member about its own axis for changing the driving ratio, comprising a centrifugal responsive weight mounted with freedom of oscillation on said planet shaft and a link motion connecting said weight with said shaft.

9. In a transmission, driving and driven elements, speed changing mechanism for connecting said elements in variable driving ratios, a planetary member in said mechanism through which the drive is imparted from the driving element to the driven element and means for automatically influencing the rotation of said member about its own axis for changing the driving ratio, comprising a centrifugal weight, means connecting said weight with said planetary member and a second weight mounted to coact with the means which connects the first named weight with the planetary member.

10. In a transmission, driving and driven elements, speed changing mechanism for connecting said elements in variable driving ratios, a motion transmitting member in said mechanism through which the drive is imparted from the driving element to the driven element and means for automatically controlling said mechanism, comprising a weight mounted to respond to centrifugal force and a link motion between said weight and said motion transmitting member adapted to move said weight against centrifugal force.

11. In a planetary transmission, the combination of means for developing a substantially constant and gradually increasing retarding effect in the planetating movement of the transmission for automatically changing the speed ratio between the driving and driven elements, comprising a planetary member functioning as an element in said transmission through which the drive is imparted from the driving element to the driven element, a planet shaft for said member, a weight journaled with freedom of oscillation on said shaft, a link motion connecting said weight with said shaft, a supplemental weight coacting with said link motion, said link motion causing said supplemental weight to move in an irregular path and to coact with the primary weight; whereby the effect of the accelerating forces incident to the oscillation of the primary weight are nullified.

In testimony whereof I have hereunto subscribed my name.

ROGER B. McMULLEN, Jr.